(12) United States Patent
Ng

(10) Patent No.: US 10,389,177 B2
(45) Date of Patent: Aug. 20, 2019

(54) MAGNETIC FIELD CONFIGURATION FOR A WIRELESS ENERGY TRANSFER SYSTEM

(71) Applicant: Elix Wireless Charging Systems Inc., Vancouver (CA)

(72) Inventor: Boon Ng, Richmond (CA)

(73) Assignee: Elix Wireless Charging Systems Inc., Vancouver (CA)

( * ) Notice: Subject to any disclaimer, the term of this patent is extended or adjusted under 35 U.S.C. 154(b) by 157 days.

(21) Appl. No.: 15/334,075

(22) Filed: Oct. 25, 2016

(65) Prior Publication Data

US 2017/0093215 A1  Mar. 30, 2017

Related U.S. Application Data

(63) Continuation of application No. PCT/CA2015/050327, filed on Apr. 20, 2015.

(60) Provisional application No. 61/984,771, filed on Apr. 26, 2014.

(51) Int. Cl.
| | |
|---|---|
| H01F 1/057 | (2006.01) |
| H01F 38/14 | (2006.01) |
| H01F 7/02 | (2006.01) |
| H02J 50/10 | (2016.01) |
| H02J 7/02 | (2016.01) |
| H02J 50/40 | (2016.01) |
| H02K 47/18 | (2006.01) |
| H02K 7/11 | (2006.01) |
| H02J 50/70 | (2016.01) |

(52) U.S. Cl.
CPC .............. *H02J 50/10* (2016.02); *H01F 1/057* (2013.01); *H01F 7/021* (2013.01); *H01F 7/0273* (2013.01); *H01F 38/14* (2013.01); *H02J 7/025* (2013.01); *H02J 50/40* (2016.02); *H02J 50/70* (2016.02); *H02K 7/11* (2013.01); *H02K 47/18* (2013.01)

(58) Field of Classification Search
CPC .......... H01F 1/057; H01F 38/14; H01F 7/021; H01F 7/0273; H02J 50/10; H02J 50/40; H02J 50/70; H02J 7/025; H02K 47/18; H02K 7/11

See application file for complete search history.

(56) References Cited

U.S. PATENT DOCUMENTS

| | | | | |
|---|---|---|---|---|
| 8,558,412 B2 | 10/2013 | Kim et al. | | |
| 8,917,154 B2* | 12/2014 | Fullerton | ............... | H01F 7/0278 335/296 |
| 8,937,521 B2* | 1/2015 | Fullerton | ............... | H01F 7/0278 335/296 |
| 2010/0033021 A1* | 2/2010 | Bennett | .................... | H02J 17/00 307/104 |

(Continued)

FOREIGN PATENT DOCUMENTS

| | | |
|---|---|---|
| WO | 2012099965 | 7/2012 |
| WO | 2013015540 | 1/2013 |

*Primary Examiner* — Rexford N Barnie
*Assistant Examiner* — Elim Ortiz
(74) *Attorney, Agent, or Firm* — Todd A. Rattray; Oyen Wiggs Green & Mutala LLP

(57) ABSTRACT

Wireless power transfer systems comprising of special arrangements of magnetic field generating materials within the wireless power transmitter and the wireless power receiver. The arrangement enables a greater amount of the magnetic field to be contained within the air gap between the wireless power transmitter and the wireless power receiver than outside of the air gap.

22 Claims, 9 Drawing Sheets

(56) References Cited

U.S. PATENT DOCUMENTS

2013/0093255 A1\* 4/2013 Jung ..................... H02J 7/025
307/104
2013/0234529 A1 9/2013 Miyauchi et al.

\* cited by examiner

MAGNETIC FIELD CONFIGURATION FOR A WIRELESS ENERGY TRANSFER SYSTEM

RELATED APPLICATIONS

This application is:

a continuation of PCT application No. PCT/CA2015/050327 which was filed on 20 Apr. 2015 and which is hereby incorporated herein by reference; and claims priority from, and the filing date benefit of, U.S. Provisional Application No. 61/984,771, filed on Apr. 26, 2014, which is also hereby incorporated herein by reference.

TECHNICAL FIELD

This application pertains to an arrangement of magnetic field generating elements comprising permanent magnets or coils or combinations thereof that enables the magnetic field to be stronger and concentrated in the air gap between the wireless power transmitter and the wireless power receiver in wireless power transfer systems.

BACKGROUND

It is well known that power can be wirelessly conveyed from one place to another using the Faraday effect, whereby a changing magnetic field causes an electrical current to flow in an electrically isolated secondary circuit. Magnetic inductive charging is the most popular form of wireless power transfer currently in use. The basic form of magnetic inductive charging uses two coils in close proximity where one coil acts as the wireless power transmitter and the other acts as the receiver of wireless power. A time-varying current flows in the transmitter coil, which produces a time-varying magnetic field. This time-varying magnetic field induces current in the nearby receiver coil (Faraday's law), which can then be used to charge various devices.

Magnetic-coupling technology has also been described as a viable wireless power transfer solution. The technology may make use of a strong magnetic coupling whereby a rotating magnet in a wireless power transmitter couples onto another nearby magnet in the wireless power receiver. The transfer of energy is via rotational magnetic coupling rather than direct magnetic induction mechanism. The time-varying magnetic field generated by the rotating magnets typically has a lower frequency compared to magnetic induction systems.

There are health and safety concerns of stray magnetic fields in wireless power transfer systems. Additionally, stray magnetic fields also induce eddy currents in nearby metallic objects creating heat which results in a loss of power transfer efficiency.

BRIEF DESCRIPTION OF DRAWINGS

In drawings, which depict non-limiting embodiments of the invention.

DETAILED DESCRIPTION

One aspect of the invention provides a magnetically coupled wireless power transfer system having a rotating wireless power transmitter magnet and a rotating wireless power receiver magnet. In some embodiments, the wireless power transmitter and receiver magnets each comprise a plurality of magnetic field generating units.

Figure 4:
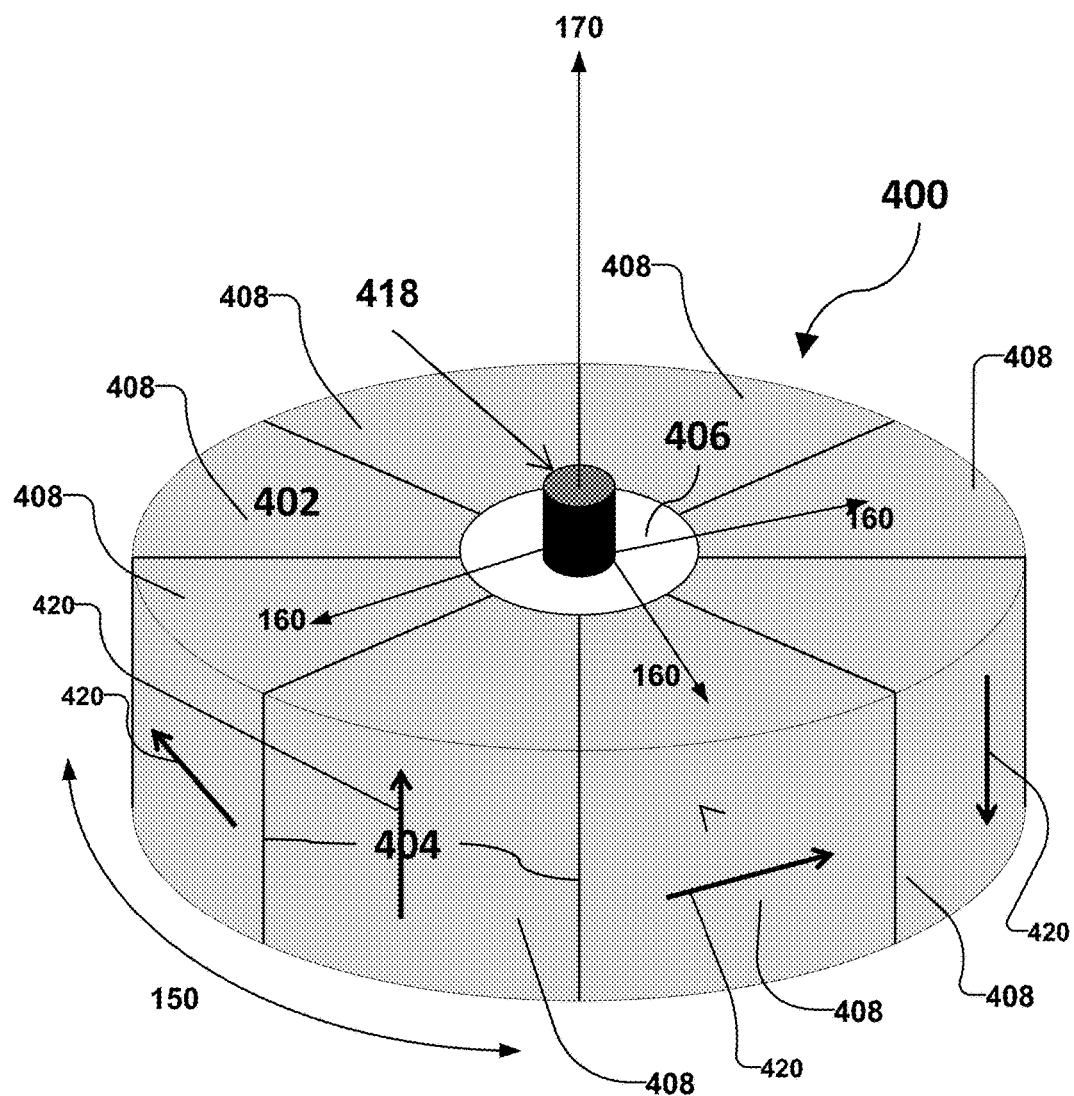
FIG. 4 is schematic view of a wireless power transmitter or receiver magnet according to an example embodiment.

FIG. 4 depicts a wireless power transmitter magnet 402 that is part of a wireless power transfer system 400 according to a particular embodiment. Wireless power transfer system 400 may comprise a power receiver magnet (not shown in the FIG. 4 view) which has features similar to those of transmitter magnet 402. Wireless power transmitter magnet 402 (or the corresponding wireless power receiver) of the FIG. 4 embodiment is generally cylindrically shaped having a cylindrical axis 170 and comprises a plurality of quasi-pie-shaped magnetic field generating units 408. Wireless power transmitter magnet 402 (or the corresponding receiver magnet) is described herein as having an axial direction 170, a generally circular magnetization-variation direction 150 and generally radial uniform-magnetization directions 160. Each magnetic field generating unit 408 exhibits predominantly a single magnetization direction 420. The magnetization direction 420 of each field generating unit 408 may be orthogonal to a corresponding uniform-magnetization direction 160, as depicted in FIG. 4. As can be seen from FIG. 4, magnetization-variation direction 150 extends circumferentially about axis 170 and uniform-magnetization directions 160 extend radially from axis 170.

Each magnetic field generating unit 408 exhibits predominantly a single magnetization direction 420, which may vary between magnetic field generating units 408 along magnetization-variation direction 150. The magnetization directions 420 of magnetic field generating units 408 adjacent to one another in magnetization-variation direction 150 may be different from one another.

Figure 1:
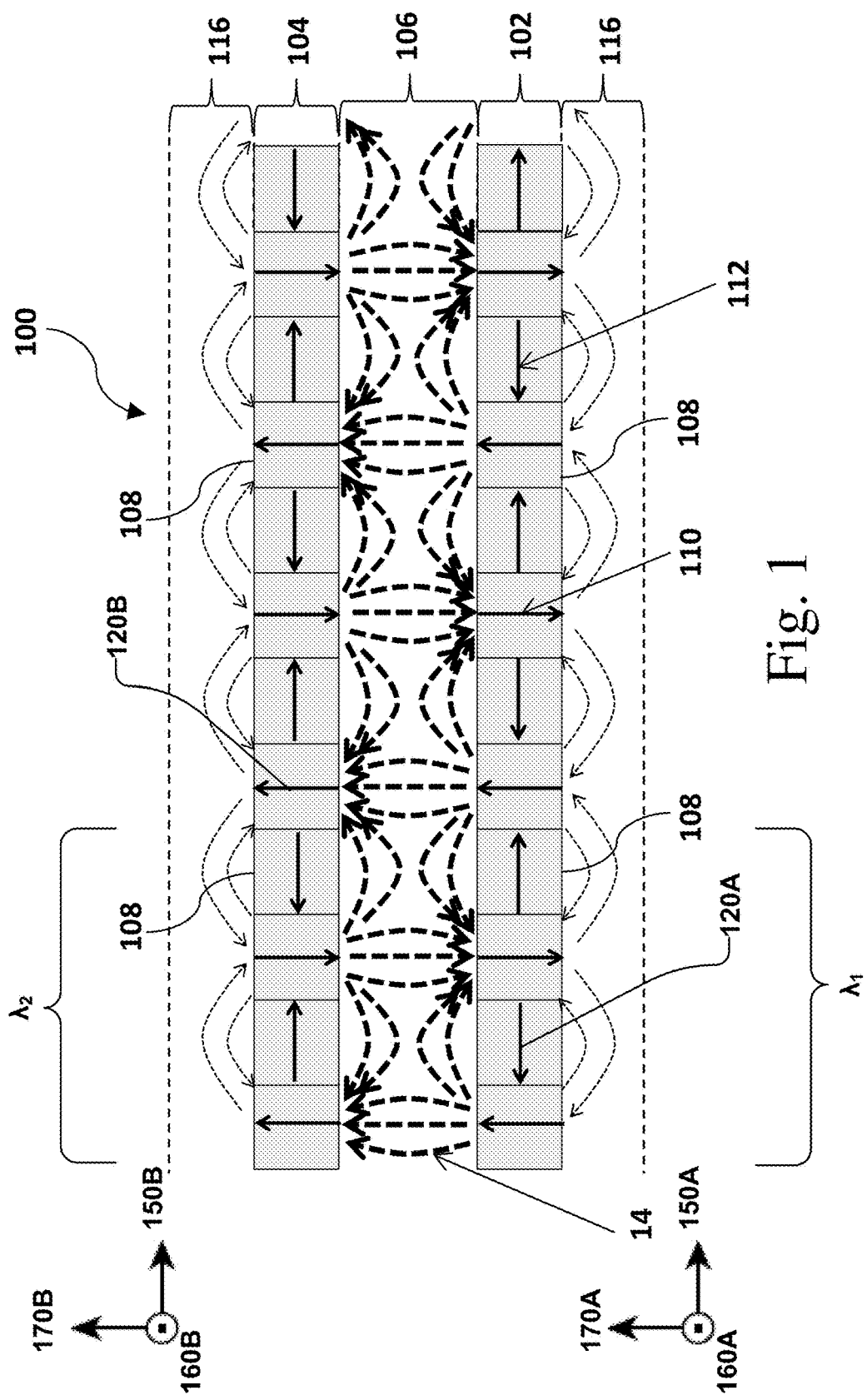
FIG. 1 is a cross-sectional view of a wireless power transfer system according to an example embodiment.

For convenience, additional embodiments herein are depicted using various types of quasi-cross-sectional illustrations. For example, FIG. 1 is a quasi-cross-sectional view of a magnetically coupled wireless power transfer system 100 according to an example embodiment having a transmitter 102 and a receiver 104, each of which is cylindrically shaped similar to power receiver/transmitter magnet 402 depicted in FIG. 4. The quasi-cross-sectional view of transmitter 102 is taken along transmitter magnetization-variation direction 150A and in an axial direction 170 and the quasi-cross-sectional view of receiver 104 is taken receiver magnetization-variation direction 150B in an axial direction 170. In other words, FIG. 1 is not a true cross-section, but instead depicts a quasi-cross-sectional (i.e. circumferentially unraveled) view of a cylindrical power transmitter magnet 102 unraveled along magnetization variation direction 150A and a quasi-cross-sectional (i.e. circumferentially unraveled) view of a cylindrical power receiver magnet 104 unraveled along magnetization variation direction 150B. For brevity, further unraveled views shown in the drawings may be referred to herein as "cross-sections".

The FIG. 1 wireless power transfer system 100 comprises a wireless power transmitter magnet 102 and wireless power receiver magnet 104 in close proximity and separated by an air gap 106. In the FIG. 1 embodiment, the wireless power transmitter magnet 102 and wireless power receiver magnet 104 each comprise individual magnetic field generating units 108. In particular, wireless power transmitter magnet 102 comprises individual transmitter magnetic field generating units 108A and wireless power receiver magnet 104 comprises individual receiver magnetic field generating units 108B. For brevity, transmitter magnetic field generating units 108A and receiver magnetic field generating units 108B may be referred to more generally herein as magnetic field generating units 108 which may refer to one or both of transmitter magnetic field generating units 108A and receiver magnetic field generating units 108B.

Magnetic field generating units 108 (i.e. transmitter magnetic field generating units 108A and receiver magnetic field generating units 108B) may comprise permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof. It will be considered in this disclosure that a permanent magnet is an object made from a material that is magnetized and creates its own persistent magnetic field.

Each magnetic field generating unit 108 may exhibit predominantly a single magnetization direction. In particular, each transmitter magnetic field generating unit 108A exhibits predominantly a corresponding first magnetization direction 120A, which may vary between transmitter magnetic field generating units 108A along transmitter magnetization-variation direction 150A. Transmitter variation direction 150A may comprise a circumferentially oriented magnetization-variation direction 150, as shown in FIG. 4. The first magnetization directions 120A of transmitter magnetic field generating units 108A adjacent to one another in transmitter magnetization-variation direction 150A may be different from one another. Each first magnetization direction 120A may also be orthogonal to a corresponding transmitter uniform-magnetization direction 160A, as depicted in FIG. 1. Each transmitter uniform-magnetization direction 160A may comprise a radially oriented uniform-magnetization direction 160 as shown in FIG. 4. First magnetization direction 120A of each transmitter magnetic field generating unit 108A may be constant along its corresponding transmitter uniform-magnetization direction 160A. In some embodiments, first magnetization direction 120A of each transmitter magnetic field generating unit 108A may be constant within each transmitter magnetic field generating unit 108A.

Similarly, each receiver magnetic field generating unit 108B exhibits predominantly a corresponding second magnetization direction 120B which may vary between receiver magnetic field generating units 108B along receiver magnetization-variation direction 150B. Receiver variation direction 150B may comprise a circumferentially oriented magnetization-variation direction 150, as shown in FIG. 4. The second magnetization directions 120B of receiver magnetic field generating units adjacent to one another in receiver magnetization-variation direction 150B may be different from one another. Each second magnetization direction 120B may be orthogonal to a corresponding receiver uniform-magnetization direction 160B, as depicted in FIG. 1. Each receiver uniform-magnetization direction 160B may comprise a radially oriented uniform-magnetization direction 160 as shown in FIG. 4. Second magnetization direction 120B of each receiver magnetic field generating unit 108B may be constant along its corresponding receiver uniform-magnetization direction 160B. In some embodiments, second magnetization direction 120B of each receiver magnetic field generating unit 108B may be constant within each receiver magnetic field generating unit 108B.

In some embodiments, transmitter magnetization-variation direction 150A is orthogonal to each of transmitter uniform-magnetization directions 160A and receiver magnetization-variation direction 150B is orthogonal to each of receiver uniform-magnetization directions 160B, as is the case in the cylindrical embodiment shown in FIG. 4, where magnetization-variation directions 150 are circumferentially oriented and uniform-magnetization directions 160 are radial. In some embodiments, transmitter magnetization-variation direction 150A and receiver magnetization-variation direction 150B may be located in planes which are parallel to one another. In some embodiments, these planes are not precisely parallel and may have normal vectors oriented at an angle between 0° and 15° relative to one another.

In some embodiments, transmitter 102 and receiver 104 are co-axial along cylinder axis 170. In some embodiments, transmitter uniform-magnetization directions 160A are distributed circumferentially about cylinder axis 170 (FIG. 4) of the wireless power transmitter and extend from cylinder axis 170 in radial directions and receiver uniform-magnetization directions 160B are distributed circumferentially about cylinder axis 170 of the wireless power receiver and extend from cylinder axis 170 in radial directions. In some embodiments, transmitter magnetization-variation direction 150A extends circumferentially about cylinder axis 170 and the receiver magnetization-variation direction 150B extends circumferentially about cylinder axis 170 of the wireless power receiver (i.e. as depicted in FIG. 4 in respect to uniform-magnetization direction 160 and magnetization-variation direction 150).

In some embodiments, the variation of first and second magnetization directions 120A, 120B may exhibit a spatially periodic pattern. In particular, the variation of first magnetization directions 120A of transmitter magnetic field generating units 108A may exhibit a first spatially periodic pattern along transmitter magnetization-variation direction 150A. The first spatially periodic pattern may have a first period comprising a number, $\lambda_1$, of transmitter magnetic field generating units 108A. The variation of second magnetization directions 120B of receiver magnetic field generating units 108B may exhibit a second spatially periodic pattern along receiver magnetization-variation direction 150B. The second spatially periodic pattern may have a second period comprising a number, $\lambda_2$, of receiver magnetic field generating units 108B.

In some embodiments, the angular orientations of first magnetization directions 120A of transmitter magnetic field generating units 108A adjacent to one another in transmitter magnetization-variation direction 150A vary about their corresponding transmitter uniform-magnetization directions 160A by a first angular offset, $\alpha_1$. In some embodiments, first angular offset, $\alpha_1$, is greater than 0° and varies depending on the number, $\lambda_1$ of transmitter magnetic field generating units 108A in the first period. In some embodiments, the number, $\lambda_1$, of transmitter magnetic field generating units 108A in the first period multiplied by the first angular offset, $\alpha_1$, is equal to 360°.

Similarly, in some embodiments, the angular orientations of second magnetization directions 120B of receiver magnetic field generating units 108B adjacent to one another in receiver magnetization-variation direction 150B vary about their corresponding receiver uniform-magnetization directions 160B by a second angular offset, $\alpha_2$. In some embodiments, second angular offset, $\alpha_2$, is greater than 0° and varies depending on the number, $\lambda_2$, of receiver magnetic field generating units 108B in the second period. In some embodiments, the number, $\lambda_2$, of transmitter magnetic field generating units 108B in the second period multiplied by the second angular offset, $\alpha_2$, is equal to 360°. As illustrated in the FIG. 1 embodiment, first angular offsets, $\alpha_1$, may be equal to second angular offsets, $\alpha_2$, although this is not necessary. In the illustrated embodiments, angular offsets, $\alpha_1$, $\alpha_2$, are constant within each transmitter magnet 102 and each receiver magnet 104 but this is not strictly necessary. In some embodiments, angular offsets, $\alpha_1$, $\alpha_2$, may vary within each transmitter magnet 102 and each receiver magnet 104

In some embodiments, the number, $\lambda_1$, of transmitter magnetic field generating units in the first period comprises three or more transmitter magnetic field generating units. For example, the first period may comprise three transmitter magnetic field generating units 108A with first angular offsets, $\alpha_1$, of approximately 120°. In another example, the first period may comprise four transmitter magnetic field generating units 108A with first angular offsets, $\alpha_1$, of approximately 90°, such as is illustrated in the FIG. 1 embodiment. Similarly, in some embodiments, the number, $\lambda_2$, of receiver magnetic field generating units in the second period comprises three or more receiver magnetic field generating units. For example, the second period may comprise three receiver magnetic field generating units 108B with second angular offsets, $\alpha_2$, of approximately 120°. In another example, the second period may comprise four receiver magnetic field generating units 108B with second angular offsets, $\alpha_2$, of approximately 90°, such as is illustrated in the FIG. 1 embodiment. However, it should be understood that the number, $\lambda_1$, of transmitter magnetic field generating units in the first period and the number, $\lambda_2$, of receiver magnetic field generating units in the second period are not limited to three or four but may vary as discussed in more detail herein.

In some embodiments, the number of transmitter magnetic field generating units 108A in a wireless power transmitter is a positive integer multiple of the number, $\lambda_1$, of transmitter magnetic field generating units 108A in a first period. Similarly, the number of receiver magnetic field generating units 108B in a wireless power receiver may be a positive integer multiple of the number, $\lambda_2$, of receiver magnetic field generating units 108B in a second period.

In some embodiments, at least one of the plurality of transmitter magnetic field generating units 108A comprises a permanent magnet and/or at least one of the receiver magnetic field generating units 108B comprises a permanent magnet. In some embodiments, at least one of the plurality of transmitter magnetic field generating units 108A comprises an electromagnetic coil and/or at least one of the receiver magnetic field generating units 108B comprises an electromagnetic coil.

In some embodiments, the first magnetization directions 120A, the first angular offsets, $\alpha_1$, and the number, $\lambda_1$, of transmitter magnetic field generating units 108A in the first period, may be such that transmitter magnetic field generating units 108A comprise a Halbach array. Similarly, in some embodiments, the second magnetization directions 120B, the second angular offsets, $\alpha_2$, and the number, $\lambda_2$, of receiver magnetic field generating units 108B in the second period may be such that receiver magnetic field generating units 108B comprise a Halbach array.

In the Halbach array embodiment depicted in the magnetically-coupled wireless power transfer system 100 in FIG. 1, a plurality of magnets or magnetic field generating units 108 are arranged in such a way that adjacent magnetic field generating units 108 (from left to right in the FIG. 1 view) of wireless power transmitter 102 have magnetization directions 120 offset by about $\alpha_1=-90°$ (about their corresponding uniform-magnetization directions 160). The adjacent magnetic field generating units 108 (from left to right in the FIG. 1 view) of the wireless power receiver 104 have magnetization directions 120 offset by about $\alpha_2=90°$ (about their corresponding uniform-magnetization directions 160B). The magnetic field generating units 108 directly aligned with each other across the air gap 106 within the wireless transmitter magnet 102 and wireless receiver magnet 104 and which have magnetization directions 120 oriented in axial directions 170 have such magnetization directions 120 oriented in the same direction along axis 170 (see vertical direction 110 of the FIG. 1 illustration). The magnetic field generating units 108 directly aligned with each other across the air gap 106 within the wireless transmitter magnet 102 and wireless receiver magnet 104 and which have magnetization directions 120 oriented in magnetization-variation directions 150 have such magnetization directions 120 oriented opposite to one another along their respective magnetization-variation directions 150 (see horizontal direction 112 of the FIG. 1 illustration).

As can be seen in the resulting magnetic flux lines in this FIG. 1 embodiment, where each of the transmitter magnet 102 and receiver magnet 104 comprise Halbach arrays, the strongest magnetic fields are depicted by the bold dotted lines 114 and are located within the air gap 106 between transmitter magnet 102 and receiver magnet 104. The weakest magnetic fields are located in the regions 116 on the opposite sides of the transmitter magnet 102 and receiver magnet 104 from the air gap 106. As a result, this Halbach arrangement of the FIG. 1 embodiment enhances the magnetic field between transmitter magnet 102 and receiver magnet 104. The enhanced magnetic field between transmitter magnet 102 and receiver magnet 104 increases the efficiency of the wireless power transfer while limiting the intensity of stray magnetic fields on the outside of the transmitter and receiver magnets.

In an embodiment, the wireless power transmitter or the wireless power receiver in the magnetically-coupled wireless power transfer system 100 in FIG. 1 is equipped with a rotor (not expressly shown in FIG. 1) to allow the wireless power receiver or transmitter to rotate about a corresponding axis 170. In another embodiment the wireless power transmitter is equipped with a rotor and the wireless power receiver is equipped with a rotor in the magnetically-coupled wireless power transfer system 100 in FIG. 1. In some embodiments, such rotors permit the wireless power transmitter and receiver to be rotatable about a common axis 170. Such rotors may comprise a rotary assembly having an axle (as shown in FIG. 4) or the like, allowed to rotate by, for example, a bushing or a bearing.

Figure 2:
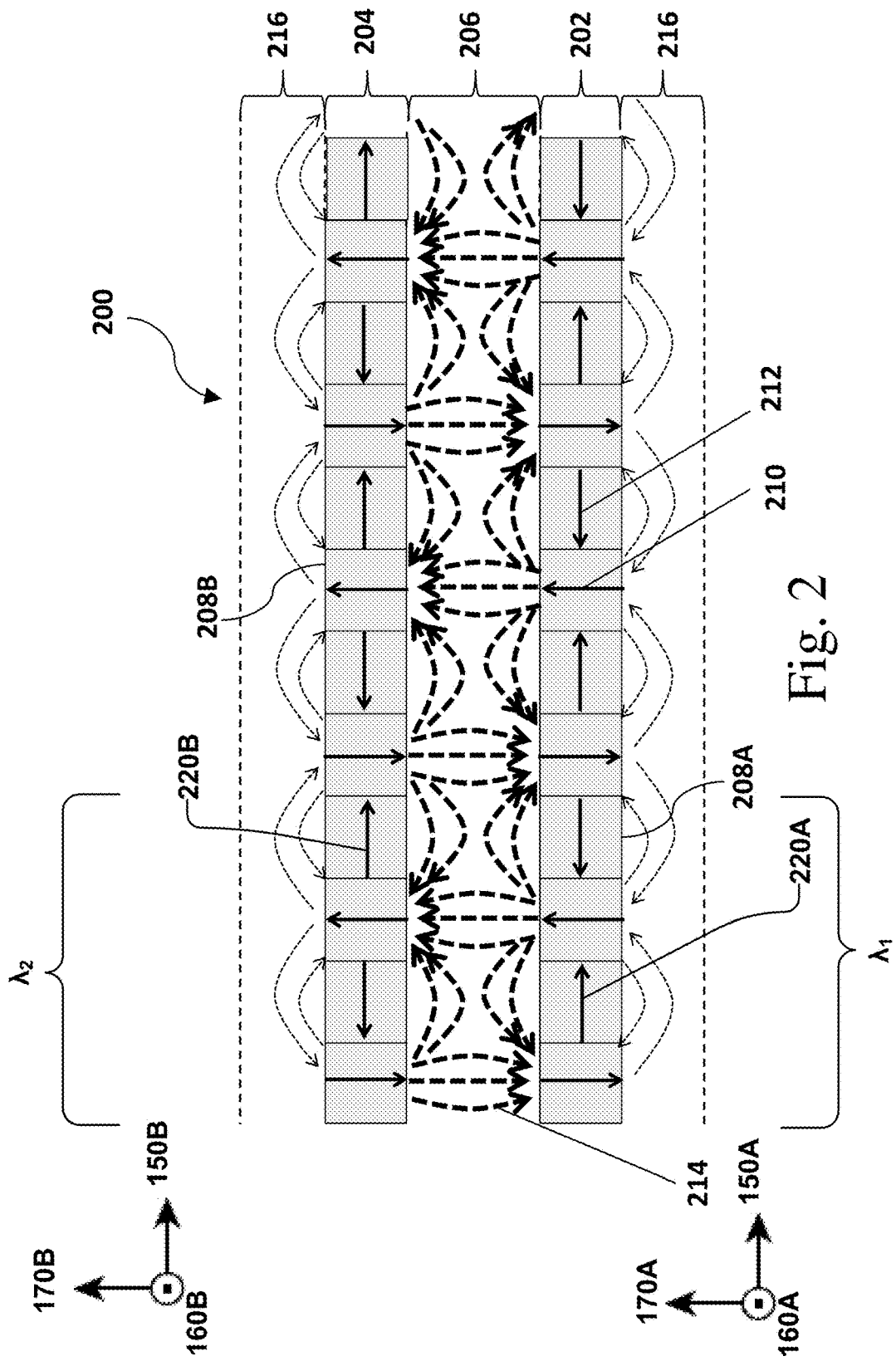
FIG. 2 is a cross-sectional view of a wireless power transfer system according to an example embodiment.

FIG. 2 is a cross-sectional view of a magnetically coupled wireless power transfer system 200 according to an example embodiment. System 200 is substantially similar to system 100 except that first and second magnetization directions 220A and 220B corresponding to field-generating units 208 have each been reversed. In other respects, system 200 exhibits similar or identical features as described above in relation to system 100 and such similar or identical features would be apparent to those skilled in the art upon reading the description and understanding the figures herein. For example, and without limitation, system 200 may comprise a plurality of transmitter magnetic field generating units 208A and a plurality of receiver magnetic field generating units 208B (similar to transmitter magnetic field generating units 108A and receiver magnetic field generating units 108B). Each transmitter magnetic field generating unit 208A may exhibit predominantly a corresponding first magnetization direction 220A and each receiver magnetic field generating unit 208B may exhibit predominantly a corresponding second magnetization direction 220B. The first magnetization directions 220A may vary in a transmitter magnetization-variation direction 150A and the second magnetization directions 220B may vary in a receiver magnetization-variation direction 150B. Each of the first magnetization directions 220A may be orthogonal to a corresponding transmitter uniform-magnetization direction 160A and each of the second magnetization directions 220B may be orthogonal to a corresponding receiver uniform-magnetization direction 160B.

System 200 of the FIG. 2 embodiment comprises a wireless power transmitter magnet 202 and wireless power receiver magnet 204 in close proximity and separated by an air gap 206. In the FIG. 2 embodiment, the plurality of individual magnetic field generating units 208 have magnetization directions 220 oriented in opposite directions to those found in the wireless power transfer system 100 in FIG. 1 (see magnetization directions 220 having vertical 210 and horizontal 212 orientations in the FIG. 2 view).

In the embodiment of a magnetically coupled wireless power transfer system in FIG. 2, the strongest magnetic fields are located within the air gap 206 as depicted by the bold dotted magnetic flux lines 214. This enhances the power transfer efficiency while the weakest magnetic fields are located in the regions 216 on the opposite sides of the transmitter magnet 202 and receiver magnet 204 from the air gap 206. If permanent magnets such as, but not limited to, NdFeB, samarium cobalt, ferrite, magnetite and alnico magnets comprised of combinations of iron, aluminum, nickel, cobalt, titanium and copper and commonly known by trade names such as Alni, Alcomax, Hycomax, Columax, and Ticonal, or combinations thereof were used to construct the wireless power transfer systems 100 and 200 in FIGS. 1 and 2, respectively, the alignment of the individual magnetic field generating units would simply need to be reversed.

The Halbach arrays in the wireless power transfer systems illustrated in FIGS. 1 and 2 may be constructed using permanent magnets such as, but not limited to, NdFeB, samarium cobalt, ferrite, magnetite and alnico magnets comprised of combinations of iron, aluminum, nickel, cobalt, titanium and copper and commonly known by trade names such as Alni, Alcomax, Hycomax, Columax, and Ticonal, or combinations thereof. Another embodiment may be envisioned where the permanent magnets may be replaced by coils. Using coils in the place of permanent magnets may offer at least three distinct advantages. Firstly, rare earth magnets can be rather expensive in cost. A low cost alternative to permanent magnets would be preferred to keep manufacturing costs low. Secondly, rare earth magnets are denser and heavier in weight than coils. Thirdly, it is much easier to change the magnetization direction in coils than permanent magnets by simply reversing the current flow within the coils.

In an embodiment, the wireless power transmitter or the wireless power receiver in the magnetically-coupled wireless power transfer system 200 in FIG. 2 is equipped with a rotor (not expressly shown in FIG. 2) to allow the wireless power receiver or transmitter to rotate about a corresponding axis 170. In another embodiment the wireless power transmitter is equipped with a rotor and the wireless power receiver is equipped with a rotor in the magnetically-coupled wireless power transfer system 200 in FIG. 2. In some embodiments, such rotors permit the wireless power transmitter and receiver to be rotatable about a common axis 170. Such rotors may comprise a rotary assembly having an axle (as shown in FIG. 4) or the like, allowed to rotate by, for example, a bushing or a bearing.

Figure 3:
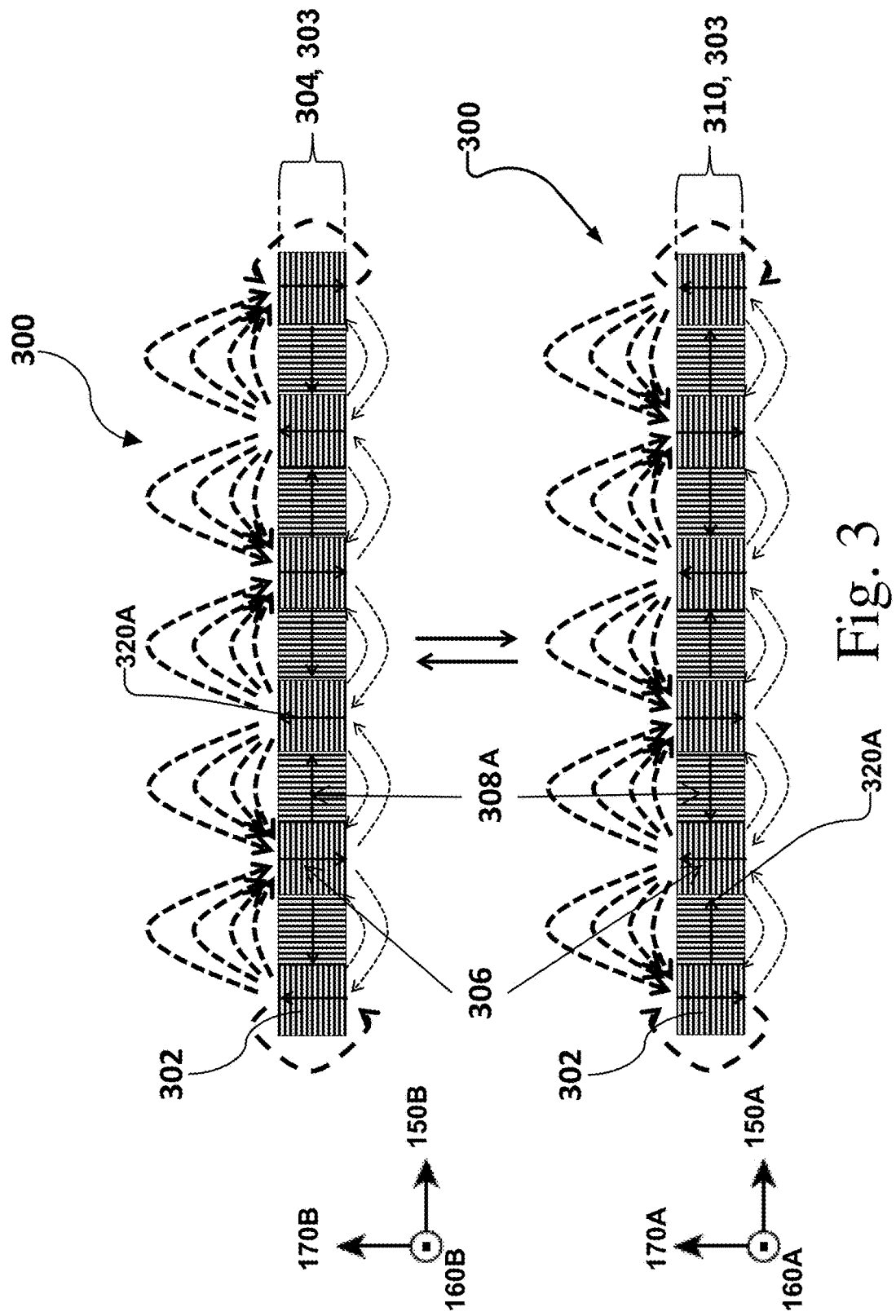
FIG. 3 is a cross-sectional view of a wireless power transmitter or receiver magnet comprising a plurality of coils as the individual magnetic field generating units according to an example embodiment.

FIG. 3 is a cross-sectional view of a wireless power transmitter magnet 303, where each field generating unit 308A comprises one or more corresponding coils 302 according to a particular embodiment. FIG. 3 shows power transmitter magnet 303 in a first state 304 and a second state 310. The Fig. power transmitter magnet 303 may comprise part of a wireless induction-based power transfer system 300, wherein alternating the current in the coils 302 of power transmitter magnet 303 induces corresponding current in one or more proximate receiver coils (not shown in FIG. 3). Power transmitter magnet 303 of system 300 exhibits some similarities to the power transmitter magnet 102 of the FIG. 1 embodiment. For example, and without limitation, power transmitter magnet 303 may comprise a plurality of transmitter magnetic field generating units 308A. Each transmitter magnetic field generating unit 308A may exhibit predominantly a corresponding first magnetization direction 320A (which may vary depending on the direction of current flow through its corresponding coil 302). The first magnetization directions 320A may vary in a transmitter magnetization-variation direction 150A. Each of the first magnetization directions 320A may be orthogonal to a corresponding transmitter uniform-magnetization direction 160A. In some embodiments, the one or more receiver coils of system 300 may be arranged in a manner similar to that of transmitter magnet 303 with receiver coil units corresponding to the field generating units 308 of transmitter magnet 303, although this is not necessary. While FIG. 3 depicts a wireless power transmitter 303, a wireless power receiver could be provided with field generating units arranged in a manner similar to the field generating units 308 of transmitter magnet 303

In some embodiments, coils 302 of transmitter 303 may be electrically connected in series. In some embodiments, coils 302 may be fabricated from a single wire. In the FIG. 3 embodiment of wireless power transmitter 303 (or a similarly configured wireless power receiver), the electrical current-carrying coils 302 may be arranged such that current flow through coils 302 in a first direction causes the magnetization directions 320A of transmitter 303 to have the Halbach arrangement 304 (shown at the top of FIG. 3) and such that current flow through coils 302 in a second (opposing) direction causes the magnetization directions 320A of transmitter 303 to have the Halbach arrangement 310 (shown at the bottom of FIG. 3). Alternating the current flow between these first and second directions creates magnetic field flux which is concentrated on one side of transmitter 303 and which varies between the FIG. 3 configurations 304, 310. This concentrated and varying magnetic field can induce current in the receiver coils of system 300.

The magnetic induction wireless power transfer system 300 of the FIG. 3 embodiment may comprise a wireless power transmitter 303 having a plurality of field generating units 308A, each of which may further comprise one or more electrical current-carrying coils 302. A wireless power receiver (not shown in FIG. 3) may comprise one or more receiver coils. In some embodiments, a wireless power receiver may comprise a plurality of magnetic field generating units, each of which may further comprise one or more electrical current-carrying coils, and which may have an arrangement similar to that of transmitter 303. An air gap may separate the wireless power transmitter 303 and wireless power receiver. The plurality of electrical current-carrying coils 302 in wireless power transmitter 303 and the wireless power receiver may be arranged in an array such that the magnetic field strength is greater in the air gap between the wireless power transmitter and wireless power receiver than the magnetic field strength outside of the air gap separating the wireless power transmitter and wireless power receiver.

The coils 302 in transmitter 303 and the receiver may be arranged such that the magnetization directions of adjacent field-generating units (in the transmitter and/or the receiver) are angularly offset from one another. In the particular case of the illustrated embodiment, adjacent field-generating units 308A exhibit angular offsets, α, of about 90° about their corresponding uniform-magnetization directions 160A. The alternating current going into each coil 302 in transmitter 303 may be phased relative to the current in other coils 302 to ensure that the magnetic field directions 320, which may be 306 (vertical in the illustrated view) and 308 (horizontal in the illustrated view) produced by the transmitting coils 302 achieve strong magnetic field (depicted by bold dotted lines) on one side compared to the magnetic field (depicted by thin dotted lines) on the other (similar to as shown in FIG. 1). This can be achieved, for example, by connecting the ends of each adjacent coil 302 in series such that either state 304 or 310 is achieved when the current reverses direction in the transmitter as shown in FIG. 3. In system 300, the strongly one-sided time varying magnetic field produced by transmitter 303 induces a time-varying current in one or more receiver coils (which may comprise a set of receiver coils having an arrangement similar to the coils 302 of transmitter 303) and which are located on the side of transmitter 303 having the stronger field and potentially separated from transmitter 303 by an air gap. Other magnetization patterns may be possible than those listed in FIG. 3 such as where the angular offset, α, may range from about 1° to about 90° or more.

FIG. 4 is a schematic view of a wireless power transmitter or receiver magnet according to an example embodiment. FIG. 4. depicts an exemplary non-unraveled view of a wireless power transmitter magnet 402 or receiver magnet. Any of the transmitter and/or receivers of the embodiments described in connection with FIGS. 1-3 and 5-8 may have the non-unraveled configuration shown in FIG. 4, although this is not necessary. System 400 represents an exemplary embodiment of a wireless power transmitter magnet 402 or receiver magnet that could exhibit any of the properties described above or below in relation to a wireless power transmitter magnet (i.e. magnet 104 or any other transmitter magnet or coil herein) or a wireless power receiver magnet (i.e. magnet 102 or any other receiver magnet or coil herein). System 400 may be substantially similar to system 100 (or 200 or any other embodiment herein), although shown from a different perspective. In other respects, system 400 may exhibit similar or identical features as described above in relation to system 100 and such similar or identical features would be apparent to those skilled in the art upon reading the description and understanding the figures herein. For example, and without limitation, power transmitter magnet 402 of system 400 comprises a plurality of magnetic field generating units 408 (similar to transmitter magnetic field generating units 108A and receiver magnetic field generating units 108B). Each magnetic field generating unit 408 may exhibit predominantly a corresponding magnetization direction 420. The magnetization directions 420 may vary in a magnetization-variation direction 150. Each of the magnetization directions 420 may be orthogonal to a corresponding uniform-magnetization direction 160.

In some embodiments of magnetic coupling wireless power transfer charging systems, rotation of coupled magnets creates a current whereby power can be transferred from a power transmitter to a receiver. FIG. 4 is an illustration of an embodiment of a wireless power transmitter magnet 402 or receiver magnet in a disk-like (or cylindrical) shape constructed of a plurality of individual petal-shaped, pie-shaped or wedge-shaped magnetic field generating units 408, which may comprise permanent magnets or coil-based magnets. In this embodiment, petal-shaped individual magnetic field generating units 408 each with a specific magnetization direction 420 are linked together or otherwise abut one another. Lines 404 denote the location of demarcation where the individual magnetic field generating units 408 are linked side-by-side.

Additionally in the FIG. 4 embodiment, the magnets are linked to an optional inner core 406 for further stabilization, although core 406 is not necessary. System 400 may further comprise a rotor 418 operative connected to transmitter magnet 402 by which transmitter magnet 402 may be rotated about axis 170 (e.g. with a motor or some other mover). Additionally or alternatively, the transmitter 402 may be rotated in the magnetic-variation direction 150 by coils carrying alternating current (AC) placed behind the magnets (e.g. coils similar to coils 706 in FIG. 7). Although the embodiment in FIG. 4 shows the transmitter magnet 402 being depicted as a disk, other non-limiting shapes may be used such as, for example, cylindrical or spherical. The magnetic field generating units 408 may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof. In the FIG. 4 system 400, a receiver magnet (not shown) may be provided and may have properties similar to transmitter magnet 402 (except that the receiver magnet is not drivingly rotated).

Figure 5:
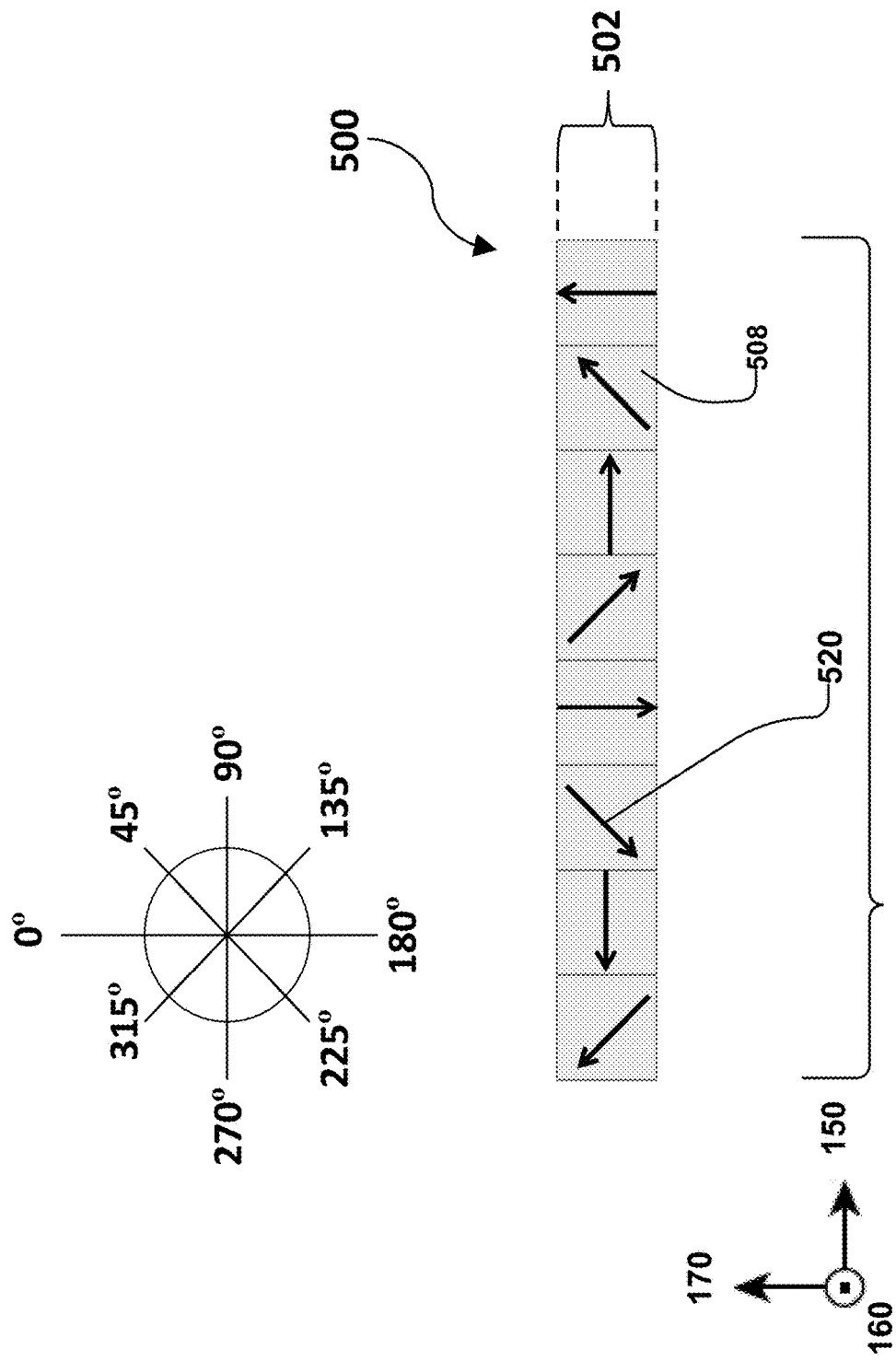
FIG. 5 is a cross-sectional view of a wireless power transmitter or receiver magnet according to an example embodiment.

FIG. 5 is a cross-sectional view of a wireless power transmitter or receiver magnet 502 according to an example embodiment which may form part of a wireless power system 500 according to an example embodiment. System 500 is substantially similar to system 100 except that the angular offset, α, of the magnetization directions 520 is smaller than in system 100. In other respects, system 500 exhibits similar or identical features as described above in relation to system 100 and such similar or identical features would be apparent to those skilled in the art upon reading the description and understanding the figures herein. For example, and without limitation, system 500 comprises a plurality of magnetic field generating units 508 (similar to transmitter magnetic field generating units 108A and receiver magnetic field generating units 108B). Each magnetic field generating unit 508 may exhibit predominantly a corresponding magnetization direction. The magnetization directions 520 may vary in a magnetization-variation direction 150. Each of the magnetization directions 520 may be orthogonal to a corresponding uniform-magnetization direction 160. The magnetization directions 520 may exhibit a spatially periodic pattern having a number, λ, of magnetic field generating units 508 in each period.

It may be envisioned that other Halbach arrangement embodiments may be used that differ from those described in FIGS. 1 and 2 that may also lead to enhancement of the magnetic field on one side of a transmitter or receiver magnet while minimizing or substantially reducing the magnetic field on the opposite side of the transmitter or receiver. The embodiment illustrated in FIG. 5 is a depiction of a cross-section (i.e. an unraveled view) of a wireless transmitter or receiver magnet 502 comprised of a plurality of individual magnetic field generating units 508 in an arrangement similar to that found in FIG. 4 (the rotor is not shown). The magnetization directions 520 between adjacent individual magnetic field generating units 508, comprising permanent magnets or coils or combinations thereof, within the wireless power transmitter or receiver exhibit angular offsets, α, of about −45° about their corresponding uniform-magnetization directions. The magnetic field generating units 508 may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof. The wireless power transmitter or receiver magnet embodiment 502 depicted in FIG. 5 may further comprise a rotor. The rotor may comprise a rotary assembly having an axle or the like, allowed to rotate by, for example, a bushing or a bearing.

Figure 6:
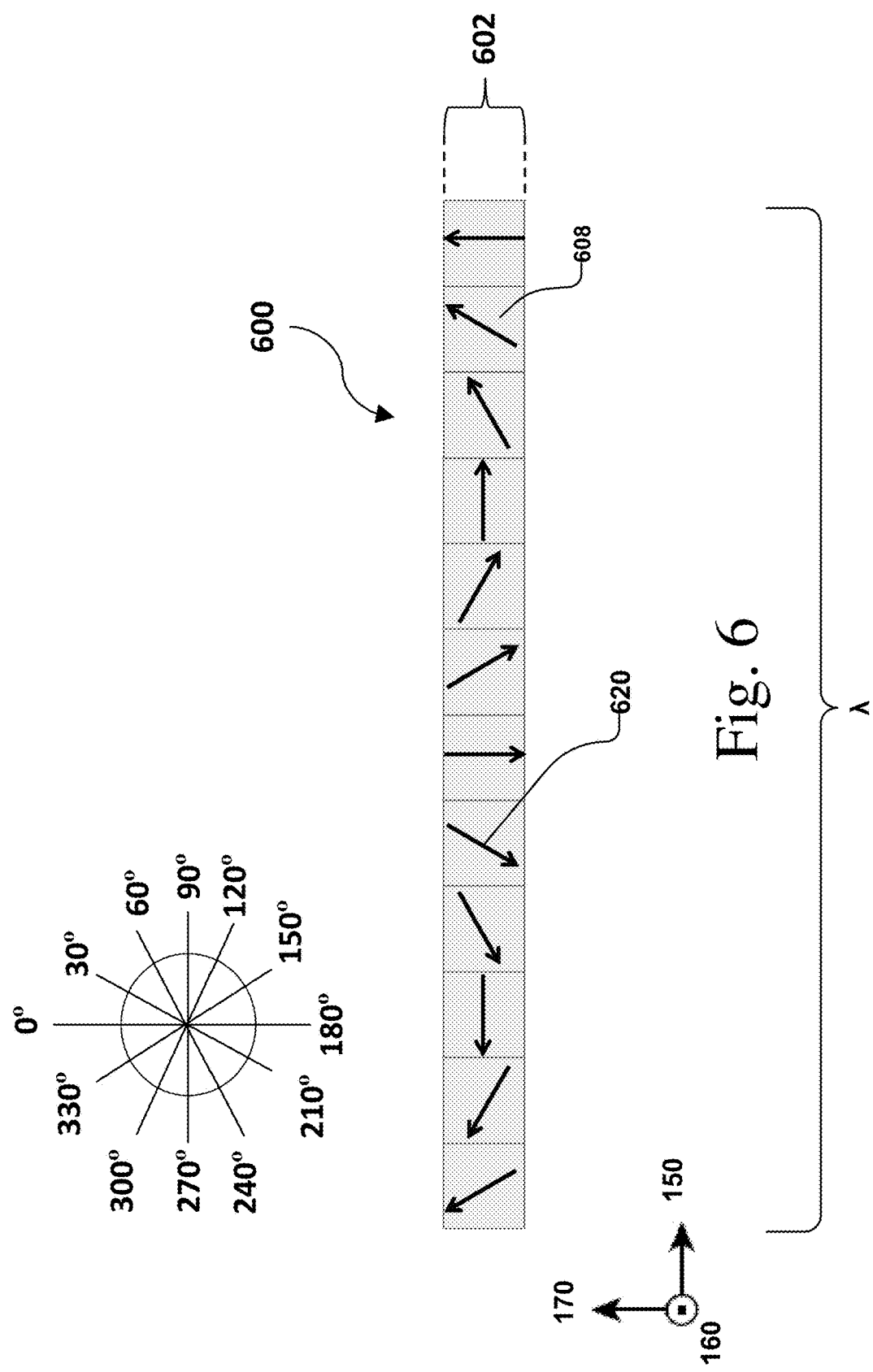
FIG. 6 is a cross-sectional view of a wireless power transmitter or receiver magnet according to an example embodiment.

FIG. 6 is a cross-sectional view of a wireless power transmitter or receiver magnet 602 according to an example embodiment which may form part of a wireless power system 600 according to an example embodiment. System 600 is substantially similar to system 100 except that the angular offset, α, of the magnetization directions 620 is smaller than in system 100. In other respects, system 600 exhibits similar or identical features as described above in relation to system 100 and such similar or identical features would be apparent to those skilled in the art upon reading the description and understanding the figures herein. For example, and without limitation, system 600 comprises a plurality of magnetic field generating units 608 (similar to transmitter magnetic field generating units 108A and receiver magnetic field generating units 108B). Each magnetic field generating unit 608 may exhibit predominantly a corresponding magnetization direction. The magnetization directions 620 may vary in a magnetization-variation direction 150. Each of the magnetization directions 620 may be orthogonal to a corresponding uniform-magnetization direction 160. The magnetization directions 620 may exhibit a spatially periodic pattern having a number, λ, of magnetic field generating units 608 in each period.

Another Halbach array embodiment may be envisioned as illustrated in FIG. 6 for use in a wireless power transfer system. FIG. 6 is a depiction of a cross-section of a wireless transmitter or receiver magnet 602 comprised of a plurality of individual magnetic field generating units 608 in an arrangement similar to that found in FIG. 4 (the rotor is not shown). The magnetization directions 620 between adjacent individual magnetic field generating units 608 comprised of permanent magnets or coils or combinations thereof within the wireless power transmitter or receiver exhibit angular offsets, α, of about −30° about their corresponding uniform-magnetization directions. The magnetic field generating units 608 may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof. The wireless power transmitter or receiver magnet embodiment 602 depicted in FIG. 6 may further comprise a rotor. The rotor may comprise a rotary assembly having an axle or the like, allowed to rotate by, for example, a bushing or a bearing.

In the Halbach array embodiments for wireless power transfer systems described herein, they have been limited to angular offsets, α, of about 30°, 45° and 90° about their corresponding uniform-magnetization directions (i.e. uniform-magnetization directions 160). This has been for purposes of description only and should not be considered limitative. In principle there could be an infinite number of angular offsets, α, in magnetization directions from about ±1° to about ±120° but for practical reasons these may be limited. Furthermore, the magnetization directions aren't required to be vertical or horizontal. It is desired that the magnetization directions "rotate" in different directions for the transmitter and receiver, thereby causing the magnetic field in the gap to become more sinusoidal and hence the induced current in the coil becomes more sinusoidal.

For magnetically coupled wireless power transfer systems, the transmitter magnet rotor may be driven by a motor and rotated to create a first time-varying magnetic field. This induces rotation in a receiver magnet across a gap to produce a second time-varying magnetic field. The transfer of power across the gap is through magnetic coupling. The second time varying magnetic field induces electrical current in coils around the receiver magnets. An alternative wireless power transfer system that reduces or even eliminates the need for a motor which in turn would lead to a lower cost system with lower maintenance is described below.

Figure 7:
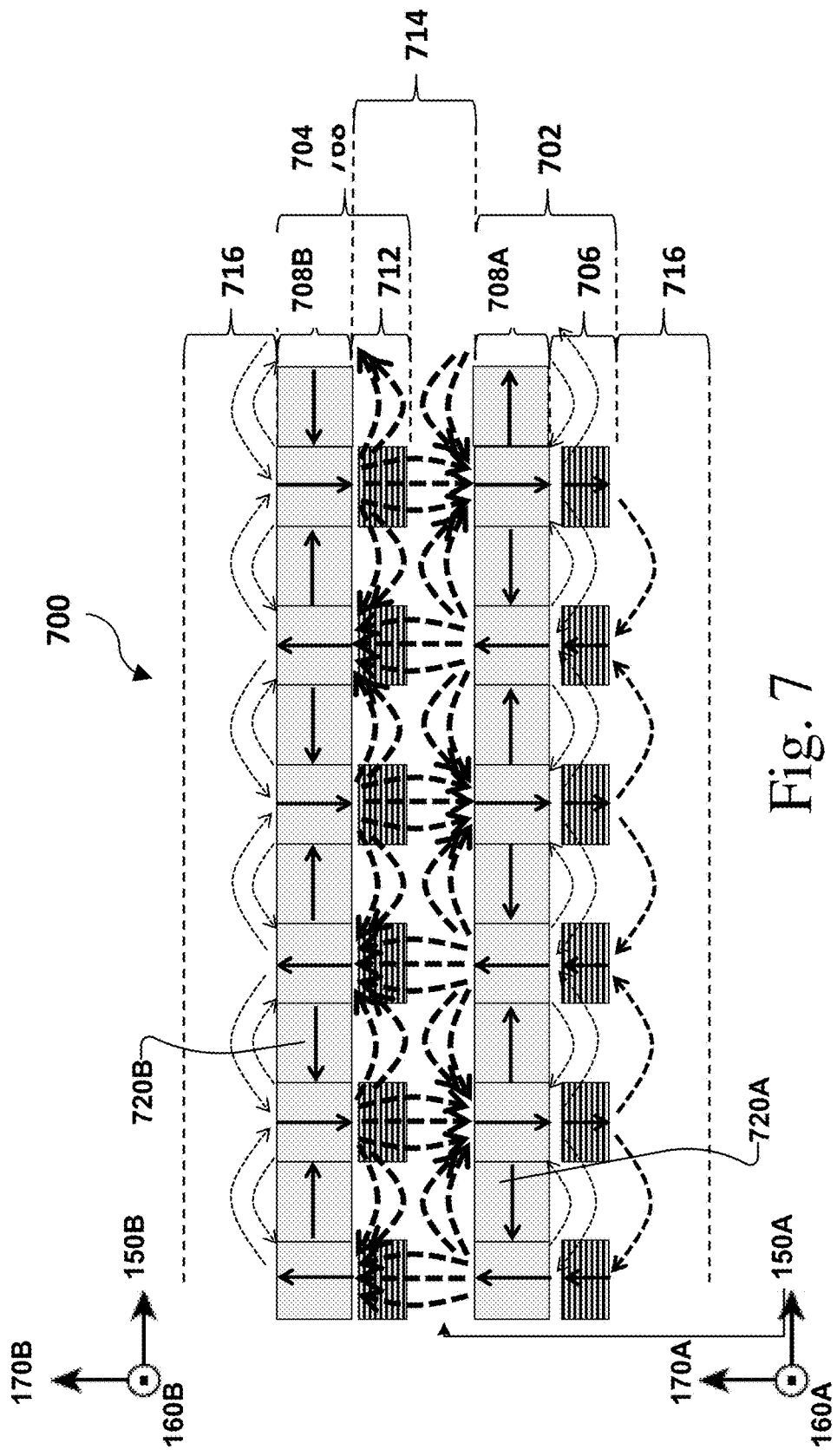
FIG. 7 is a cross-sectional view of a wireless power transfer system comprising individual magnetic field generating units, some of which comprise both permanent magnets and stationary coils according to an example embodiment.

FIG. 7 is a cross-sectional view of a wireless power transfer system 700 comprising individual magnetic field generating units made up of both permanent magnets and stationary coils according to an example embodiment. System 700 is substantially similar to system 100 except that coils 706 and 712 have been added, as described below. In other respects, system 700 exhibits similar or identical features as described above in relation to system 100 and such similar or identical features would be apparent to those skilled in the art upon reading the description and understanding the figures herein. For example, and without limitation, system 700 may comprise a plurality of transmitter magnetic field generating units 708A and a plurality of receiver magnetic field generating units 708B (similar to transmitter magnetic field generating units 108A and receiver magnetic field generating units 108B). Each transmitter magnetic field generating unit 708A may exhibit predominantly a corresponding first magnetization direction 720A and each receiver magnetic field generating unit 708B may exhibit predominantly a corresponding second magnetization direction 720B. The first magnetization directions 720A may vary in a transmitter magnetization-variation direction 150A and the second magnetization directions 720B may vary in a receiver magnetization-variation direction 150B. Each of the first magnetization directions 720A may be orthogonal to a corresponding transmitter uniform-magnetization direction 160A and each of the second magnetization directions 720B may be orthogonal to a corresponding receiver uniform-magnetization direction 160B.

The embodiment illustrated in FIG. 7 is a cross-section of a wireless power transfer system 700 comprises a combination of a plurality of permanent magnets in a Halbach array and stationary coils. The wireless power transfer system comprises a wireless power transmitter 702 that further may comprise a plurality of transmitter magnetic field generating units 708A aligned in the form of a Halbach transmitter magnet (rotor not shown) where the horizontal and vertical magnetization directions 720A of the individual transmitter magnetic field generating units 708A exhibit angular offsets, α, of about −90° about their corresponding uniform-magnetization directions 160A. Placed below the plurality of transmitter magnetic field generating units 708A is a plurality of stationary electrical current-carrying coils 706. An alternating electrical current may be passed through stationary electrical current-carrying coils 706 to induce rotational motion in the transmitter magnetic field generating units 708A.

The wireless power transfer system 700 further comprises a wireless power receiver 704 that comprises a plurality of receiver magnetic field generating units 708B aligned in the form of a Halbach receiver magnet (rotor not shown). The horizontal and vertical magnetization directions 720B of the individual receiver magnetic field generating units 708B are offset by an angular offset, α, of about +90° about their corresponding uniform-magnetization directions, or opposite to that found in the Halbach transmitter magnet. The vertical magnetization directions of the Halbach receiver and transmitter magnets are aligned in the same direction while the horizontal magnetization directions of the Halbach transmitter and receiver magnets are in opposite directions. Placed between the plurality of receiver magnetic field generating units 708B in the Halbach receiver magnet (rotor not shown) of the wireless power receiver and the plurality of transmitter magnetic field generating units 708A in the Halbach transmitter magnet (rotor not shown) of the wireless power transmitter is a plurality of stationary electrical current-carrying power receiver coils 712 in which an alternating current is induced by the enhanced magnetic field caused by rotation of the receiver and transmitter magnetic arrays around an axis (i.e. axis 170, not shown). It is preferred that the stationary receiver coils 712 are located in close proximity to the Halbach receiver magnet as the magnetic field is strongest. The wireless power transmitter 702 and wireless power receiver 704 are separated by an air gap 714. Within the air gap 714 are located the strongest magnetic fields of the Halbach transmitter and receiver magnets. In the regions 716 on the opposite sides of the Halbach transmitter and receiver magnets from the air gap 714 is located the area where the magnetic field is substantially reduced relative to the magnetic fields within the air gap 714. This Halbach arrangement embodiment substantially reduces stray magnetic fields and enhances the magnetic fields within the air gap 714 in order to enhance the efficiency of the power transmission.

Other Halbach arrangement embodiments may be envisioned for use in wireless power transfer systems using combinations of permanent magnets and coils as explained herein and illustrated in the non-limiting example in FIG. 7. For example, magnetization directions of the individual magnetic field generating units within the Halbach transmitter and receiver magnets may exhibit angular offsets, α, of about −45° to about −30° about their corresponding uniform-magnetization directions as described in FIGS. 5 and 6, respectively. Other angular offsets, α, of varying angles may be used from about ±1° to about ±90° or more. The magnetic field generating units 708A, 708B may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof.

In an embodiment, the wireless power transmitter in the wireless power transfer system 700 in FIG. 7 further comprises a rotor. In another embodiment, the wireless power receiver in the wireless power transfer system 700 in FIG. 7 further comprises a rotor. In another embodiment, both the wireless power transmitter comprises a rotor and the wireless power receiver comprises a rotor in the wireless power transfer system 700 depicted in FIG. 7. The rotor may comprise a rotary assembly having an axle or the like, allowed to rotate by, for example, a bushing or a bearing.

The wireless power transfer system 700 embodiment shown in FIG. 7 may be operated as follows. Changing the current in the stationary transmitter coils 706 creates a magnetic field that induces the rotation/movement of the Halbach transmitter magnetic field generating units 708A which produces a strong first time-varying magnetic field. This first magnetic field couples with the Halbach receiver magnetic field generating units 708B which rotate/move and produce a second time varying magnetic field that in turn induces a time-varying current in the stationary receiver coils 712 located in the air gap 714 where the magnetic field is the strongest. This results in power being transferred from the wireless power transmitter 702 to the wireless power receiver 704.

Figure 8:
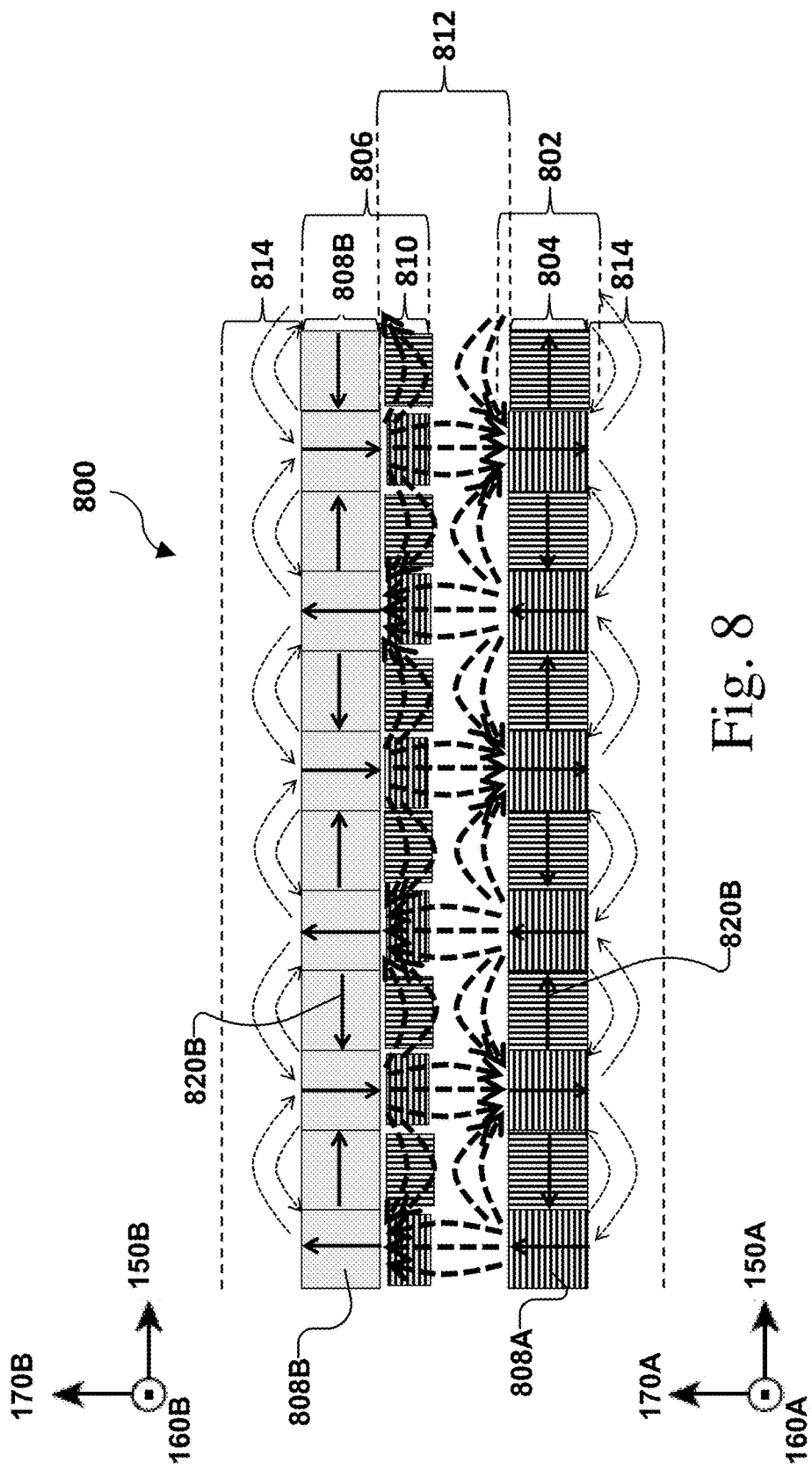
FIG. 8 is a cross-section of a wireless power transfer system comprising a combination of a plurality of moveable permanent magnets in a Halbach array and stationary coils according to an example embodiment.

FIG. 8 is a cross-section of a wireless power transfer system 800 comprising a combination of a plurality of moveable permanent magnets in a Halbach array and stationary coils according to an example embodiment. System 800 is substantially similar to system 100 except that rotating wireless power transmitter 102 has been replaced with a stationary wireless power transmitter 802 (similar to that of FIG. 2). In other respects, system 800 exhibits similar or identical features as described above in relation to system 100 and such similar or identical features would be apparent to those skilled in the art upon reading the description and understanding the figures herein. For example, and without limitation, system 800 may comprise a plurality of transmitter magnetic field generating units 808A and a plurality of receiver magnetic field generating units 808B (similar to receiver magnetic field generating units 108B). Each transmitter magnetic field generating unit 808A may exhibit predominantly a corresponding first magnetization direction 820A and each receiver magnetic field generating unit 808B may exhibit predominantly a corresponding second magnetization direction 820B. The first magnetization directions 820A may vary in a transmitter magnetization-variation direction 150A and the second magnetization directions 820B may vary in a receiver magnetization-variation direction 150B. Each of the first magnetization directions 820A may be orthogonal to a corresponding transmitter uniform-magnetization direction 160A and each of the second magnetization directions 820B may be orthogonal to a corresponding receiver uniform-magnetization direction 160B.

The wireless power transfer system 800 in FIG. 8 is comprised of a wireless power transmitter 802 that is further comprised of a plurality of stationary electrical current-carrying coils 804 through which a time-varying current may be passed to create a first time varying magnetic field in a Halbach manner where the resulting horizontal and vertical magnetization directions exhibit angular offsets, α, of about −90° about their corresponding uniform-magnetization directions. The wireless power transfer system 800 further comprises a wireless power receiver 806 that is comprised of a plurality of magnetic field generating units 808B aligned in the form of a Halbach receiver magnet (rotor not shown) where the horizontal and vertical magnetization directions 820B of the individual receiver magnetic field generating units 808B exhibit angular offsets, α, of about +90° about their corresponding uniform-magnetization directions, or opposite to that found in the Halbach transmitter magnet. The vertical magnetization directions of the Halbach receiver magnet and magnetic field generated by the stationary transmitter coils may be aligned in the same direction while the horizontal magnetization directions are in opposite directions. The magnetic field generating units 808B may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof.

Placed between the plurality of magnetic field generating units 808B in the Halbach receiver magnet of the wireless power receiver and the plurality of stationary coils 804 in the Halbach transmitter of the wireless power transmitter 802 is a plurality of stationary power receiver coils 810 where a current is induced. It is preferred that the stationary receiver coils 810 are located close to the magnetic field generating units 808 as the magnetic field is strongest. The wireless power transmitter 802 and wireless power receiver 806 are in close proximity and separated by an air gap 812. Within the air gap 812 is located the strongest magnetic fields (represented by bold dotted lines) of the Halbach power transmitter 802 and receiver 806. In the regions 814 on the opposite sides of the power transmitter and receivers from the air gap 812 are located in the area where the magnetic field is substantially reduced relative to the fields within the air gap 812. This Halbach arrangement embodiment substantially reduces stray magnetic fields and enhances the magnetic fields within the air gap 812 in order to enhance the efficiency of the power transmission. Other Halbach arrangement embodiments may be envisioned to use in wireless power transfer systems using combinations of permanent magnets and coils as explained herein and illustrated in the non-limiting example in FIG. 8. For example, magnetization directions 820 of the individual magnetic field generating units within the Halbach transmitter and receiver may exhibit angular offsets, α, of about −45° to about −30° about their corresponding uniform-magnetization directions as described in FIGS. 5 and 6, respectively. Other angular offsets, α, of varying angles may be used. In an embodiment, the wireless power receiver further consists of a rotor in the wireless power transfer system 800 depicted in FIG. 8.

The wireless power transfer system 800 embodiment shown in FIG. 8 may be operated as follows. Applying a current, such as an alternating current, in the stationary electrical current-carrying transmitter coils 804 creates a first time varying magnetic field in a Halbach arrangement where each individual coil has an angular offset, α. This first time varying magnetic field magnetically couples onto the Halbach magnetic field generating units (permanent magnets) 808B (rotor not shown) in the wireless power transfer receiver 806. This induces motion/rotation of the magnetic field generating units 808B. This motion/rotation generates a secondary time-varying magnetic field resulting in electrical current being induced in the coils 810 adjacent to the magnetic field generating units 808B.

In another embodiment related to wireless power transfer system 800 in FIG. 8, the wireless power transmitter consists of stationary electrical current-carrying coils and a plurality of moveable permanent magnets in a Halbach array and a rotor. The wireless power receiver comprises stationary current-carrying coils only. Applying a current to the stationary coils in the transmitter creates a first time varying magnetic field in a Halbach arrangement which induces motion/rotation of the magnetic field generating units in the transmitter. This motion/rotation generates a secondary time-varying magnetic field resulting in electrical current being induced in the coils in the wireless power receiver.

Figure 9:
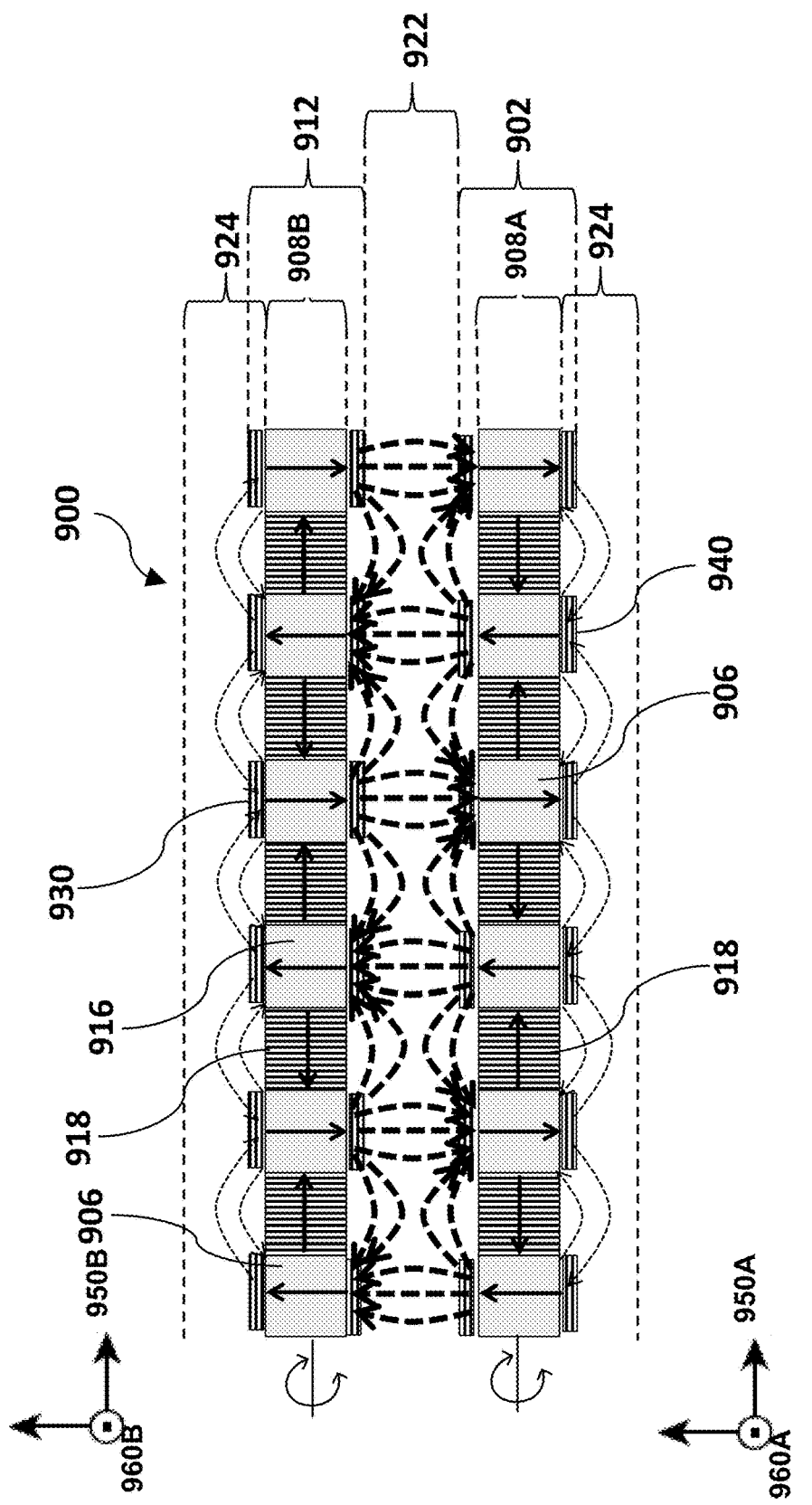
FIG. 9 is a cross-section of a wireless power transfer system comprising a combination of a plurality of moveable permanent magnets and stationary coils according to an example embodiment.

FIG. 9 is a cross-section (taken in a plane orthogonal to uniform-magnetization directions 960A, 960B) of another embodiment of a wireless power transfer system 900 comprising a combination of a plurality of moveable permanent magnets and stationary coils according to an example embodiment. System 900 comprises a cylindrical transmitter magnet 908A with an axial transmitter magnetization-variation direction 950A about which magnets 908A are rotated. System 900 also comprises a cylindrical receiver magnet 908B with an axial receiver magnetization-variation direction 950B about which magnets 908B are rotated. Rotating magnets 908A and 908B may be magnetically coupled. System 900 is similar to system 100 except as described herein. In other respects, system 900 exhibits similar or identical features as described above in relation to system 100 and such similar or identical features would be apparent to those skilled in the art upon reading the description and understanding the figures herein. For example, and without limitation, system 900 may comprise a plurality of transmitter magnetic field generating units 908A and a plurality of receiver magnetic field generating units 908B (similar to transmitter magnetic field generating units 108A and receiver magnetic field generating units 108B, although different in shape). Each transmitter magnetic field generating unit 908A may exhibit predominantly a corresponding first magnetization direction 920A and each receiver magnetic field generating unit 908B may exhibit predominantly a corresponding second magnetization direction 920B. The first magnetization directions 920A may vary in a transmitter magnetization-variation direction 950A and the second magnetization directions 920B may vary in a receiver magnetization-variation direction 950B. Each of the first magnetization directions 920A may be orthogonal to a corresponding transmitter uniform-magnetization direction 960A and each of the second magnetization directions 920B may be orthogonal to a corresponding receiver uniform-magnetization direction 960B.

The wireless power transfer system comprises a wireless power transmitter 902 that further may comprise a plurality of transmitter magnetic field generating units 908A. Magnetic field generating units 908A comprised of permanent magnets 906 interleaved with stationary electrical current-carrying coils 918A. The permanent magnets 906 may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof.

The permanent magnets 906 may be in a cylindrical shape (with an axis parallel to magnetic variation direction 950A) interconnected by a common shaft (not shown) that passes through the stationary coils 918A. The permanent magnets 906 may rotate about the magnetization-variation direction 950A and are further surrounded by coils 940. Magnet rotation is induced by application of a current in the coils 940 surrounding the permanent magnets 906. The wireless power transfer system 900 further comprises a wireless power receiver 912 that further comprises a plurality of receiver magnetic field generating units 908B comprised of permanent magnets 916 interleaved with stationary coils 918B. The permanent magnets 916 may be in a cylindrical shape interconnected by a common shaft (not shown) that passes through the stationary electrical current-carrying coils 918B. The magnets may rotate about magnetization-variation direction 950B and are further surrounded by coils 930. The wireless power transmitter 902 and receiver 912 are further separated by an air gap 922.

In the example in FIG. 9, the magnetization directions of the plurality of magnetic field generating units 908A of the wireless power transmitter 902 exhibit angular offsets, α, of about −90° about their corresponding uniform-magnetization directions 960. The magnetization directions 920 of the magnetic field generating units 908B of the wireless power receiver 912 exhibit angular offsets, α, of about +90° about their corresponding uniform-magnetization directions. Other angular offsets, α, of magnetization directions of various angles may be used. The permanent magnets 916 may be comprised of permanent magnets such as, but not limited to, NdFeB, samarium cobalt, ferrite, magnetite and alnico magnets made up of combinations of iron, aluminum, nickel, cobalt, titanium and copper and commonly known by trade names such as Alni, Alcomax, Hycomax, Columax, and Ticonal, or combinations thereof.

In an embodiment, the wireless power transmitter in the wireless power transfer system 900 in FIG. 9 further comprises a rotor. In another embodiment, the wireless power receiver in the wireless power transfer system 900 in FIG. 9 further comprises a rotor. In another embodiment, both the wireless power transmitter comprises a rotor and the wireless power receiver comprises a rotor in the wireless power transfer system 900 depicted in FIG. 9. The rotor may comprise a rotary assembly having an axle or the like parallel with magnetization-variation directions 950A, 950B, allowed to rotate by, for example, a bushing or a bearing.

The wireless power transfer system 900 embodiment shown in FIG. 9 may be operated as follows. The stationary coils 918A and 940 in the wireless power transmitter 902 are energized by alternating current to produce a time varying magnetic field that rotates the permanent magnets 906 connected by a common shaft on an axis parallel to magnetization-variation direction 950B. The coils 918A and 940 are interconnected and electrical current through the adjacent coils 918A will flow in a way to maintain a Halbach magnetic field with magnetic flux directed towards the wireless power receiver as much as possible. This forms the first time-varying magnetic field with magnetic field focused towards the receiver 912. The permanent magnets 916 linked by a common shaft in a direction parallel to magnetization-variation direction 950A with interleaved coils 918B on an axis parallel to magnetization-variation direction 950A in the wireless power receiver 912 rotates through magnetic coupling with the first time-varying magnetic field. This motion generates a second time-varying magnetic field which induces electrical current through the coils 930 around the permanent magnets 916. These coils 930 are connected to the adjacent (interleaved) coils 918B, which produces a third time-varying magnetic field that cancels and reinforces the second time-varying magnetic field such that a second Halbach magnetic field is formed at the receiver. The magnetic flux is focused towards the wireless power transmitter with the highest magnetic fields within the air gap 922. In the regions 924 on the opposite sides of the power transmitter and receivers from the air gap 922 are located in the area where the magnetic field is substantially reduced relative to the fields within the air gap 922. This Halbach arrangement may substantially reduce stray magnetic fields and enhances the magnetic fields within the air gap 922 in order to enhance the efficiency of the power transmission.

The invention described herein may be used in wireless power transmission systems based on the Faraday effect and Halbach arrays to increase the efficiency of the power transmission and make safer for consumers by reducing stray magnetic fields. Said wireless power transmission systems may be used in applications such as, but not limited to, boats, automobiles, trucks, delivery vehicles, transit buses, ships, aircraft, motorcycles, electric bicycles, consumer devices and medical implants and other devices. A further advantage of the invention described may be the reduction in cost and in weight by eliminating the need for soft-iron cores in the coils. Lastly, the systems described herein may be scalable to more magnets and/or coils to produce different power ranges.

As will be apparent to those skilled in the art in the light of the foregoing disclosure, many alterations and modifications are possible in the practice of this invention without departing from the spirit or scope thereof. For example:

Various embodiments described herein (e.g. systems 100, 200, 300, etc.) may each include a variety of features. It should be understood that this description and the accompanying claims include additional embodiments that comprise combinations of any of the features of any of the embodiments herein.

In some instances, this description and the accompanying claims use terms generally to describe directions, orientations, shapes, relationships (e.g. equalities) and/or the like. For example, transmitter magnetic field generating unit may have a first magnetization direction that is orthogonal to a transmitter magnetization-variation direction. Such directions, orientations, shapes, relationships and/or the like should be considered to accommodate the specified directions, orientations, shapes, relationships and/or the like and/or relatively small deviations (from an operational or engineering perspective) from the specified directions, orientations, shapes, relationships and/or the like.

In some instances, this description and the accompanying claims refer to transmitter magnetic field generating units using the reference numerals 108A, 208A, 308A etc. and to receiver magnetic field generating units using the reference numerals 108B, 208B, 308B etc. It should be understood from this description that magnetic field generating units 408, 508, 608 and like reference numerals may refer to transmitter magnetic field generating units or receiver generating units generally. Similarly, magnetization-variation directions 150 and like reference numerals may refer to transmitter magnetization-variation directions or receiver magnetization-variation directions. Similarly, this naming principle may apply to magnetization directions (e.g. magnetization directions 420, 520, 620 and like reference numerals), uniform-magnetization directions (e.g. uniform-magnetization directions 160 and like reference numerals) and generally herein.

In some instances, this description may refer to horizontal and vertical magnetization directions in the figures. This is done for convenience. It should be understood that a horizontal magnetization direction is any magnetization direction that, when broken down into horizontal (in the page) and vertical (in the page) components, exhibits a horizontal component of magnitude greater than zero and vertical magnetization directions are magnetization directions that are substantially vertical (in the page).

In some instances, this description and the accompanying claims refer to the horizontal and vertical directions. This is done for convenience and refers merely to the horizontal and vertical directions in FIGS. 1 to 9. It should be understood that entire systems (e.g. systems 100, 200, 300 etc.) may be rotated such that what is horizontal or vertical in the figures is no longer horizontal or vertical in practice.

In some instances, this description and the accompanying claims refer to receiver magnetic field generating units. Where the receiver field generating units comprise coils, this reference is a matter of nomenclature and doesn't necessarily mean that the receiver magnetic field generating units are driven to generate corresponding magnetic fields. In practice, the receiver magnetic field generating units may instead have currents induced therein, which induced currents may in turn create corresponding magnetic fields.

While a number of exemplary aspects and embodiments have been discussed above, those of skill in the art will recognize certain modifications, permutations, additions and sub-combinations thereof. It is therefore intended that the following appended aspects or claims and aspects or claims hereafter introduced are interpreted to include all such modifications, permutations, additions and sub-combinations.

What is claimed is:

1. A magnetically-coupled wireless power transfer system, comprising:
   a wireless power transmitter further comprising a plurality of transmitter magnetic field generating units;
   a first time-varying magnetic field created by the wireless power transmitter;
   a wireless power receiver further comprising a plurality of receiver magnetic field generating units, the plurality of receiver magnetic field generating units located in the first time-varying magnetic field and supported to permit rotation about a receiver axis in response to the first time-varying magnetic field;
   an air gap separating the wireless power transmitter and wireless power receiver;
   wherein said plurality of transmitter magnetic field generating units in the wireless power transmitter are arranged in a first Halbach array and said plurality of receiver magnetic field generating units in the wireless power receiver are arranged in a second Halbach array; and
   wherein said arrangement of the plurality of transmitter magnetic field generating units in the wireless power transmitter in the first Halbach array and said arrangement of the plurality of receiver magnetic field generating units in the wireless power receiver in the second Halbach array provide a combined magnetic field, wherein a magnetic field strength of the combined magnetic field is greater in the air gap between the wireless power transmitter and wireless power receiver than the magnetic field strength outside of the air gap separating the wireless power transmitter and wireless power receiver.

2. A magnetically-coupled wireless power transfer system according to claim 1, wherein:
   each of the plurality of transmitter magnetic field generating units exhibits predominantly a corresponding first magnetization direction and the first magnetization directions of the plurality of transmitter magnetic field generating units vary along a transmitter magnetization-variation direction; and
   each of the plurality of receiver magnetic field generating units exhibits predominantly a corresponding second magnetization direction and the second magnetization directions of the plurality of receiver magnetic field generating units vary along a receiver magnetization-variation direction.

3. A magnetically-coupled wireless power transfer system according to claim 2, wherein
   the first magnetization directions of transmitter magnetic field generating units adjacent to one another in the transmitter magnetization-variation direction are different from one another; and
   the second magnetization directions of receiver magnetic field generating units adjacent to one another in the receiver magnetization-variation direction are different from one another.

4. A magnetically-coupled wireless power transfer system according to claim 2, wherein each of the first magnetization directions is orthogonal to a corresponding transmitter uniform-magnetization direction and each of the second magnetization directions is orthogonal to a corresponding receiver uniform-magnetization direction.

5. A magnetically-coupled wireless power transfer system according claim 2, wherein the transmitter magnetization-variation direction is orthogonal to each of the transmitter uniform-magnetization directions and the receiver magnetization-variation direction is orthogonal to each of the receiver uniform-magnetization directions.

6. A magnetically-coupled wireless power transfer system according to claim 2, wherein the first magnetization direction of each transmitter magnetic field generating unit is constant along its corresponding transmitter uniform-magnetization direction and the second magnetization direction of each receiver magnetic field generating unit is constant along its corresponding receiver uniform-magnetization direction.

7. A magnetically-coupled wireless power transfer system according to claim 3, wherein the first magnetization direction of each transmitter magnetic field generating unit is constant within the transmitter magnetic field generating unit and the second magnetization direction of each receiver magnetic field generating unit is constant within the receiver magnetic field generating unit.

8. A magnetically-coupled wireless power transfer system according to claim 2, wherein the variation of the first magnetization directions of the transmitter magnetic field generating units exhibits a first spatially periodic pattern along the transmitter magnetization-variation direction, the first spatially periodic pattern having a first period $\lambda_1$ in the transmitter magnetization-variation direction, where $\lambda_1$ equals the number of transmitter magnetic field generating units in the first period, and the variation of the second magnetization directions of the receiver magnetic field generating units exhibits a second spatially periodic pattern along the receiver magnetization-variation direction, the second spatially periodic pattern having a second period $\lambda_2$ in the receiver magnetization-variation direction, where $\lambda_2$ equals the number of receiver magnetic field generating units in the second period.

9. A magnetically-coupled wireless power transfer system according to claim 8, wherein the number, $\lambda_1$, of transmitter magnetic field generating units in the first period comprises four or more transmitter magnetic field generating units and the number, $\lambda_2$, of receiver magnetic field generating units in the second period comprises four or more receiver magnetic field generating units.

10. A magnetically-coupled wireless power transfer system according to claim 3, wherein the variation of the first magnetization directions of the transmitter magnetic field generating units exhibits a first spatially periodic pattern along the transmitter magnetization-variation direction, the first spatially periodic pattern having a first period $\lambda_1$ in the transmitter magnetization-variation direction, where $\lambda_1$ equals the number of transmitter magnetic field generating units in the first period, and the variation of the second magnetization directions of the receiver magnetic field generating units exhibits a second spatially periodic pattern along the receiver magnetization-variation direction, the second spatially periodic pattern having a second period $\lambda_2$ in the receiver magnetization-variation direction, where $\lambda_2$ equals the number of receiver magnetic field generating units in the second period and wherein angular orientations of the first magnetization directions of transmitter magnetic field generating units adjacent to one another in the transmitter magnetization-variation direction about their corresponding transmitter uniform-magnetization directions differ from one another by a first angular offset, $\alpha_1$, and angular orientations of the second magnetization directions of receiver magnetic field generating units adjacent to one another in the receiver magnetization-variation direction about their corresponding receiver uniform-magnetization directions differ from one another by a second angular offset, $\alpha_2$.

11. A magnetically-coupled wireless power transfer system according to claim 10, wherein the first angular offset, $\alpha_1$ is equal to the second angular offset, $\alpha_2$.

12. A magnetically-coupled wireless power transfer system according to claim 10, wherein the number, $\lambda_1$, of transmitter magnetic field generating units in the first period multiplied by the first angular offset, $\alpha_1$, is equal to 360° and the number, $\lambda_2$, of receiver magnetic field generating units in the second period multiplied by the second angular offset, $\alpha_2$, is equal to 360°.

13. A magnetically-coupled wireless power transfer system according to claim 9, wherein the plurality of transmitter magnetic field generating units comprises a positive integer multiple of the number, $\lambda_1$, of transmitter magnetic field generating units in the first period and the plurality of receiver magnetic field generating units comprises a positive integer multiple of the number, $\lambda_2$, of receiver magnetic field generating units in the second period.

14. A magnetically-coupled wireless power transfer system according to claim 2, wherein:
the wireless power transmitter and the wireless power receiver are each cylindrical in shape; and
the transmitter magnetic field generating units and the receiver magnetic field generating units are each generally wedge-shaped.

15. A magnetically-coupled wireless power transfer system according to claim 2, wherein:
the transmitter uniform-magnetization directions are radial about a cylinder axis of the wireless power transmitter and the receiver uniform-magnetization directions are radial about a cylinder axis of the wireless power receiver; and
the transmitter magnetization-variation direction is circular about the cylinder axis of the wireless power transmitter and the receiver magnetization-variation direction is circular about the cylinder axis of the wireless power receiver.

16. A magnetically-coupled wireless power transfer system according to claim 2, wherein at least one of the plurality of transmitter magnetic field generating units comprises a permanent magnet and at least one of the receiver magnetic field generating units comprises a permanent magnet.

17. A magnetically-coupled wireless power transfer system according to claim 2, wherein at least one of the plurality of transmitter magnetic field generating units comprises an electromagnetic coil.

18. A magnetically-coupled wireless power transfer system according to claim 16, wherein the permanent magnets comprises NdFeB, samarium cobalt, magnetite, ferrite or an alloy comprising three or more of iron, aluminum, nickel, cobalt, titanium and copper or a combination thereof.

19. A magnetically-coupled wireless power transfer system according to claim 1, wherein the wireless power transmitter comprises at least one of: a rotor mechanically connected to a motor to move the wireless power transmitter about a transmitter axis; and a plurality of current carrying coils arranged in proximity to the transmitter magnetic field generating units to move the wireless power transmitter about a transmitter axis via magnetic interaction.

20. A magnetically-coupled wireless power transfer system according to claim 1, wherein the wireless power receiver is magnetically coupled to the wireless power transmitter.

21. A magnetically-coupled wireless power transfer system according to claim 20, wherein the wireless power receiver rotates in response to a rotation of the wireless power transmitter.

22. A magnetically-coupled wireless power transfer system according to claim 21, wherein the rotation of the wireless power receiver induces a time-varying current in electrical current-carrying coils that are in close proximity to the receiver.

* * * * *